(12) United States Patent
Genissel

(10) Patent No.: US 8,856,508 B2
(45) Date of Patent: Oct. 7, 2014

(54) ONBOARD ACCESS CONTROL SYSTEM FOR COMMUNICATION FROM THE OPEN DOMAIN TO THE AVIONICS DOMAIN

(75) Inventor: Jean-Paul Genissel, Pibrac (FR)

(73) Assignee: Airbus Operations S.A.S., Toulouse (FR)

( * ) Notice: Subject to any disclaimer, the term of this patent is extended or adjusted under 35 U.S.C. 154(b) by 845 days.

(21) Appl. No.: 12/601,830

(22) PCT Filed: Jun. 3, 2008

(86) PCT No.: PCT/EP2008/056844
§ 371 (c)(1),
(2), (4) Date: Apr. 6, 2010

(87) PCT Pub. No.: WO2008/148756
PCT Pub. Date: Dec. 11, 2008

(65) Prior Publication Data
US 2010/0199083 A1  Aug. 5, 2010

(30) Foreign Application Priority Data
Jun. 6, 2007  (FR) .................................. 07 55514

(51) Int. Cl.
| | |
|---|---|
| H04L 29/06 | (2006.01) |
| H04L 9/08 | (2006.01) |
| H04L 9/00 | (2006.01) |
| H04N 7/167 | (2011.01) |
| H04N 21/214 | (2011.01) |
| G06F 11/07 | (2006.01) |
| G06F 11/30 | (2006.01) |
| G06F 17/50 | (2006.01) |

(52) U.S. Cl.
CPC . *H04L 29/06* (2013.01); *H04L 9/08* (2013.01); *H04L 63/0428* (2013.01); *H04L 63/0442* (2013.01); *H04L 9/00* (2013.01); *H04N 7/1675* (2013.01); *H04N 21/2146* (2013.01); *G06F 11/0739* (2013.01); *G06F 11/3013* (2013.01); *G06F 17/5095* (2013.01)

USPC ........................................................ 713/150

(58) Field of Classification Search
CPC ............. H04L 29/06; H04L 9/08; H04L 9/00; H04N 7/1675; H04N 21/2146; G06F 11/0739
USPC ........................................................ 713/150
See application file for complete search history.

(56) References Cited

U.S. PATENT DOCUMENTS 4,203,166 A * 5/1980 Ehrsam et al. ................. 380/45
6,882,654 B1 * 4/2005 Nelson .......................... 370/401

(Continued)

FOREIGN PATENT DOCUMENTS

| EP | 1 164 766 A2 | 12/2001 |
|---|---|---|
| EP | 1 164 766 A3 | 12/2001 |

(Continued)

OTHER PUBLICATIONS

Thompson, "Wireless and Internet communications technologies for monitoring and control", 2003.*

(Continued)

*Primary Examiner* — Krista Zele
*Assistant Examiner* — Ondrej Vostal
(74) *Attorney, Agent, or Firm* — Oblon, Spivak, McClelland, Maier & Neustadt, L.L.P.

(57) ABSTRACT

An onboard access control system to an information system onboard an aircraft, for communication from the open domain to the avionics domain, the open end avionics domains being connected to each other through a single-directional link from the avionics domain to the open domain. The system includes: a security device including: access switches controlling access to the avionics and open domains, a controller, a module for acquisition putting data into buffer memory and transmission to the avionics domain, a data control module, an acquisition module from the open domain and putting into buffer memory, and an operator's authentication mechanism.

9 Claims, 2 Drawing Sheets

(56) References Cited

U.S. PATENT DOCUMENTS

| | | | |
|---|---|---|---|
| 6,925,088 B1* | 8/2005 | Moreaux | 370/407 |
| 7,640,433 B1* | 12/2009 | Marek et al. | 713/181 |
| 7,689,697 B2* | 3/2010 | Chiba | 709/227 |
| 7,904,569 B1* | 3/2011 | Gelvin et al. | 709/229 |
| 7,904,951 B1* | 3/2011 | Ebrahimi et al. | 726/12 |
| 7,983,195 B2* | 7/2011 | Andreoletti et al. | 370/255 |
| 8,019,338 B2* | 9/2011 | Malaga et al. | 455/431 |
| 8,064,347 B2* | 11/2011 | Dietz et al. | 370/241 |
| 2003/0147377 A1* | 8/2003 | Saint Etienne et al. | 370/351 |
| 2004/0103296 A1* | 5/2004 | Harp et al. | 713/200 |
| 2005/0089050 A1* | 4/2005 | Cheriton | 370/397 |
| 2006/0059024 A1* | 3/2006 | Bailey et al. | 705/5 |
| 2006/0184784 A1 | 8/2006 | Shani | |
| 2007/0061460 A1* | 3/2007 | Khan et al. | 709/225 |
| 2007/0064725 A1* | 3/2007 | Minami et al. | 370/463 |
| 2007/0067487 A1* | 3/2007 | Freebairn et al. | 709/238 |
| 2007/0115938 A1* | 5/2007 | Conzachi et al. | 370/352 |
| 2007/0127460 A1* | 6/2007 | Wilber et al. | 370/389 |
| 2007/0230429 A1* | 10/2007 | Sannino | 370/342 |
| 2007/0254634 A1* | 11/2007 | Costa-Requena et al. | 455/412.1 |
| 2007/0274327 A1* | 11/2007 | Kaarela et al. | 370/401 |
| 2007/0282951 A1* | 12/2007 | Selimis et al. | 709/205 |
| 2008/0010100 A1* | 1/2008 | Orttung et al. | 705/5 |
| 2008/0034120 A1* | 2/2008 | Oyadomari et al. | 709/248 |
| 2008/0043768 A1* | 2/2008 | Lopez et al. | 370/412 |
| 2008/0069125 A1* | 3/2008 | Reed et al. | 370/410 |
| 2008/0086637 A1* | 4/2008 | Royalty | 713/168 |
| 2008/0098212 A1* | 4/2008 | Helms et al. | 713/155 |
| 2008/0205416 A1* | 8/2008 | DeChiara | 370/401 |
| 2008/0225888 A1* | 9/2008 | Valluri et al. | 370/466 |
| 2009/0122812 A1* | 5/2009 | Steiner et al. | 370/503 |
| 2010/0289671 A1* | 11/2010 | Hauty et al. | 340/945 |

FOREIGN PATENT DOCUMENTS

| | | |
|---|---|---|
| WO | WO 01/95069 A2 | 12/2001 |
| WO | WO 01/95069 A3 | 12/2001 |

OTHER PUBLICATIONS

Ridouard et al., "Stochiastic network calculus for end-to-end delays distribution evaluation on an avionics switched Ethernet", 2007.*

Mifdaoui et al., "Full Duplex Switched Ethernet for Next Generation '1553B'-based Applications", 2007.*

Krodel, "Commercial Off-The-Shelf Real-Time Operating System and Architectural Considerations", 2004.*

Thanthry et al., "Aviation Data Networks: Security Issues and Network Architecture", 2004.*

Taylor, "System-Wide Information Management for Aeronautical Communications", 2004.*

Ho, "Implementation of a secure gateway on Hughes Aircrat's Engineering Design Network", 1990.*

Ballard Technology, "Digital Time Division Command/Response Multiplex Data Bus", 1978.*

Ballard Technology, "Military Handbook Multiplex Applications Handbook", 1988.*

AIM GmbH, "AFDX Training", 2010.*

Courtney, "Aircraft Data Network, Part 5—Network Domain Characteristics and Functional Elements", 2004.*

AIM GmbH, "AFDX Training", 2005.*

Condor Engineering, "AFDX Protocol Tutorial", 2005.* techSAT, "AFDX/ARINC 664 Tutorial", 2008.*

AIM GmbH, "MIL-STD-1553 Tutorial", 2002.*

SE-545, "AFDX: Real-Time Solutions for the A380", Oct 2007.*

Gutierrez et al., "Response time analysis in AFDX networks with sub-virtual links and prioritized switches", 2012.*

McHale, "AFDX technology to improve communications on Boeing 787", 2005.*

Alena et al., "Communications for Integrated Modular Avionics", 2006.*

Aeronatical Radio Inc., "Aircraft Data Network Part 7 Avionics Full Duplex Switched Ethernet (AFDX) Network", ARINC specification 664P7, Jun. 2005.*

Aeronatical Radio Inc., "ARINC Project Paper 664 Aircraft Data Networks Part 5 Network Domain Characteristics and Function Elements", ARINC 664 Part 5, Feb 2004.*

Ballard Technology, "Multiplex Applications Handbook", 1988.*

* cited by examiner

ONBOARD ACCESS CONTROL SYSTEM FOR COMMUNICATION FROM THE OPEN DOMAIN TO THE AVIONICS DOMAIN

TECHNICAL FIELD

The invention relates to an onboard access control system for communication from the open domain to the avionics domain. This system may be placed onboard an aircraft, for example a plane.

STATE OF PRIOR ART

An onboard information system is a system composed of two "domains": the avionics domain (AW), that satisfies clearly defined certification rules, and the open domain (OW), based on general public computer components. At the present time, this communication is only authorised in the direction from the avionics domain to the open domain, subsequent to data processing security directives. Nevertheless, there is a need to communicate in both directions and this need has become imperative in the interest of the system.

The Avionics Domain

The avionics domain is dedicated to avionics computers that process all avionics functions including critical functions such as flight controls.

The avionics domain must be protected against data processing attacks in order to guarantee its integrity and thus guarantee operating reliability. Avionics equipment is developed in agreement with aerial navigability rules and regulations dictated by official services, thus guaranteeing flight safety. The secure domain must be protected against uncontrolled intrusion attempts that could originate from the open domain.

The avionics domain is dedicated to processing a number of items including:
- everything necessary for immediate operations contributing to operational use of the aircraft and good flight control;
- everything necessary for flight preparation for good operational use;
- acquisitions of some "sensitive" data originating from the ground.

The Open Domain

The "open" domain includes an application server supplying a host capacity for maintenance applications, operational applications and passenger cabin applications that have no impact on flight safety. An onboard Ethernet local network in the aircraft enables information exchanges between the different components of the open domain. The open domain may also communicate with an information system belonging to the airline company based on the ground, through a high speed satellite communication.

This domain is considered to be "open" because it is open to every operator. It is considered as being uncontrolled, because it uses general public components and data processing standards: Ethernet local networks, COTS (Components Off The Shelf) software and hardware.

The computer security elements used must guarantee that any viruses and/or attacks of any type cannot be propagated.

The "open" domain provides:
- low cost solutions, for example market solutions, to reduce the complexity related to security, safety and availability;
- maximum flexibility for the operator who wishes to install his own applications ("Third party applications") with a minimum involvement or even no involvement by the aircraft manufacturer, thus limiting implementation costs and times;
- ease of installation of applications for which the airline is responsible, satisfying operational rules (FAR 121, FAR 145 . . . );
- a capacity to accommodate non-major functions/applications for immediate operations.

Another purpose of the invention is to take account of needs and general and specific objectives of an onboard information system particularly related to data security, safety, performances, installation, configuration and aircraft certification, by providing an onboard access control system enabling secure communication from the open domain to the avionics domain, so as to enable two-directional communications between the avionics domain and the open domain.

PRESENTATION OF THE INVENTION

The invention relates to an onboard system controlling access to an information system, onboard an aircraft, comprising an avionics domain satisfying clearly defined certification rules, and an open domain based on general public components accessible to all operators, these two domains being connected to each other through a single-directional link from the avionics domain to the open domain for security reasons, characterised in that it comprises:
- operator authentication means,
- a security device comprising:
  - a set of two access switches controlling access to each of these two domains, operating like an electronic lock,
  - a controller that controls opening of these two switches for durations that depend on the operator's profile,
  - a module for acquisition, putting data originating from the open domain into buffer memory and transmission to the avionics domain,
  - an acquisition module acquiring data from the open domain and putting it into buffer memory,
  - a data control module that defines filter criteria applicable to all exchanges between buffer memories, to enable secure communication from the open domain to the avionics domain and thus allow two-directional communications between these two domains.

In a first variant, the operator authentication means comprise means of reading electronic cards, biometric means or code reading means.

In a second variant, the operator authentication means comprise a secure link between the aircraft and the ground enabling an operator located on the ground to authenticate himself, this link then being connected to the controller.

Advantageously, the switches are hardware switches.

The control module may include protection mechanisms in the network, transport and application layers of the OSI model. Advantageously, the control module includes encryption means. The control module may be configured by a data filtering table.

Advantageously, the protocols used in each of these two avionics and open domains are different and participate in increasing the security of data exchanges between these two domains.

DETAILED PRESENTATION OF PARTICULAR EMBODIMENTS

Figure 1:
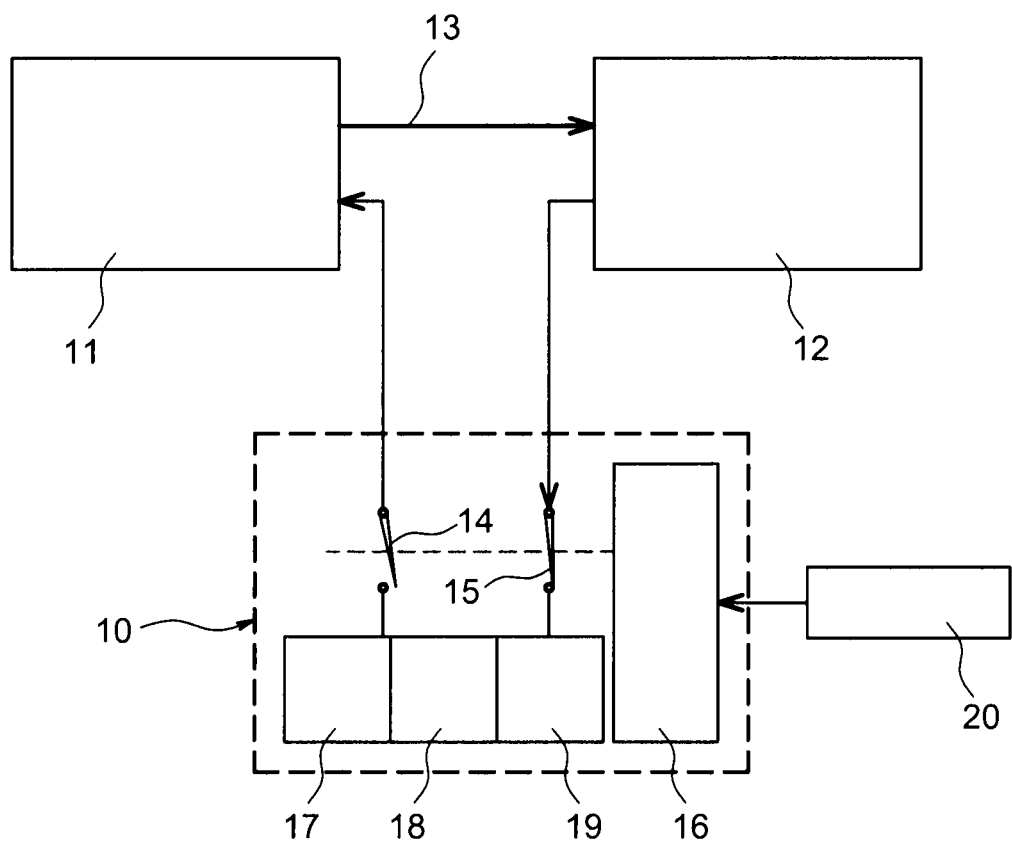
FIG. 1 shows the onboard access control system according to the invention.

As shown in FIG. 1, the onboard access control system according to the invention is connected between the avionics domain 11 and the open domain 12. These two domains 11 and 12 are conventionally connected by a single-directional link 13 in the direction from the avionics domain 11 towards the open domain 12.

The system according to the invention comprises:
 a security device 10 comprising:
  hardware switches 14 and 15 providing access to each of these two domains,
  a controller 16,
  a module 17 for acquisition, buffer memorisation and transmission to the avionics domain 11,
  a data control module ("firewall") 18, and
  an acquisition module 19 for data from the open domain 12 and for buffer memorisation,
 operator authentication means 20.

In a first variant, the operator authentication means consist of an authentication device that for example includes means of reading electronic card, biometric means or code reading means.

In a second variant, the operator authentication means comprise a secure link between the aircraft and the ground enabling an operator located on the ground to authenticate himself, this link then being connected to the controller 16.

The onboard access control system according to the invention is similar to an "electronic lock" comprising an access switch to each avionics domain and to the open domain. Data can pass from one domain to the other when the access switch to the other domain is closed, thus preventing any permanent physical link between the two domains and can give protected communications between these two domains.

Opening and closing of the two hardware switches 14 and 15 are controlled by the security device 10 after the operator has been authenticated. This security device 10 allows a secure link in the opposite direction of the link 13, from the open domain 12 to the avionics domain 11.

The volume of data transmitted is determined based on the capacity of the two acquisition, buffer memorisation and transmission modules 17 and 19.

Due to the security device 10, the link from the open domain to the avionics domain is always open, which prevents permanent access to the avionics domain, limiting or even prohibiting access of any malicious intruder.

This security device 10 has the following functions.

Controller 16

The controller 16 accepts authentication of the operator and defines rules used by the security device 10 that operates as a function of the operator's profile. The controller 16 configures the security device 10 as a function of operators to make the connection between the open domain and the avionics domain. In particular, the controller 16 assigns a time window that depends on the operator's profile, during which communication is possible. To achieve this, it controls opening of access switches 14 and 15 for durations that depend on the operator's profile determined during authentication of the operator.

Access Module 19

The access module 19 to the open domain 12 takes account of use of a first protocol and stores data originating from the open domain 12 in buffer memory.

Access Module 17

The access module 17 to the avionics domain 11 allows for the use of a second protocol and stores data originating from the open domain 12 in buffer memory (through control module 18) so that they can be transmitted to the avionics domain 11.

Control Module 18

The control module 18 provides protection between the open domain 12 and the avionics domain 11. In particular, it performs a firewall function. To achieve this, it can be configured by a loaded data filtering table in which filter criteria are defined and are applicable to all exchanges between buffer memories. This control module 18 checks the data integrity.

The security level to be applied is determined as a function of the type of data to be transferred. Examples of risks to be taken into account are particularly attacks by intruders, commercial espionage, accidental disclosure of company data (users, employees and company data) and service denial attacks.

The first and second protocols are chosen from among protocols well known to those skilled in the art. They may be different and thus participate in securing data exchanges between the open domain 12 and the avionics domain 11.

Such a control module 18 conventionally includes protection mechanisms for the following layers of the OSI ("Open System Interconnection") model:
 network layer,
 transport layer,
 application layer.

It may use encryption to enable confidentiality, authentication and to improve integrity.

Access Switches 14 and 15

Controller 16 manages opening and closing of access switches 14 and 15. They operate like an electronic lock in which data can pass from one domain to the other only when the switch in the opposite domain is closed, which prevents any physical link between the two domains.

A process in which data are transmitted between the open domain 12 and the avionics domain 11 includes the following steps:

Operator Authentication

The controller 16 acquires data transmitted by the operator authentication device 20 and allocates rights as a function of the user's profile, with the following steps:
 close the open domain access switch 15,
 initialise the first protocol,
 store data in buffer memory.

Store data in Buffer Memory
 store data in buffer memory, in module 19 from which all prior data have been removed, for all candidate data to be transmitted,
 open the open domain access switch 15.

Checking/Filtering Data
 transmit data stored in buffer memory to the control module 18,
 filter data as a function of determined filter criteria.

Store Authorised Data in Buffer Memory
 check that switches 14 and 15 controlling access to the avionics domain 11 and the open domain 12 are open and closed respectively,
 transmit data to the buffer memorisation module 17, after all previous data have been deleted, erase memories in module 19, close the avionics domain access switch 14 (the open domain access switch 15 being open), initialise the second protocol to transfer data from the acquisition module 17 to the avionics domain.

Figure 2:
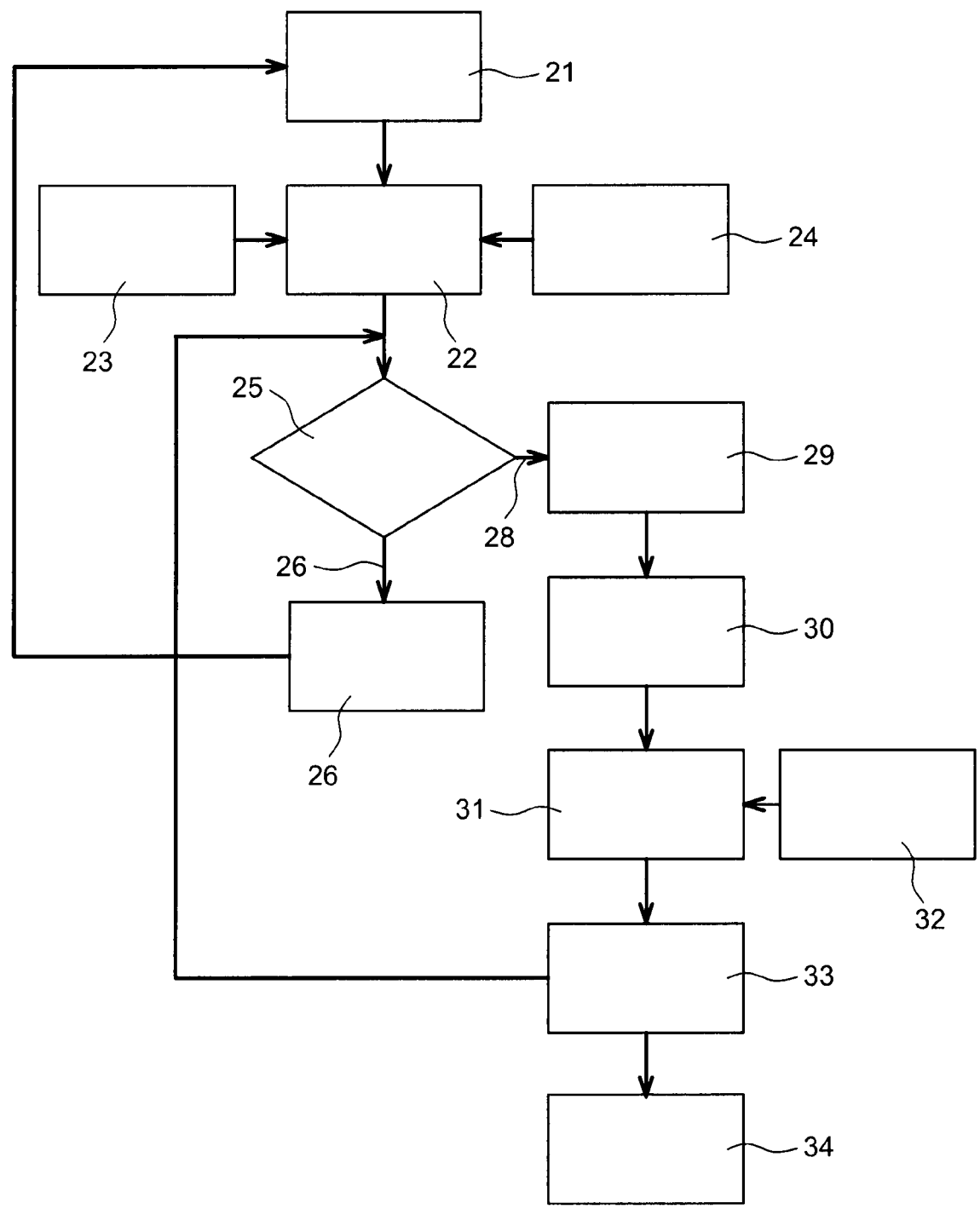
FIG. 2 is a flowchart illustrating an example of how the onboard access control system according to the invention operates.

FIG. 2 is a flowchart illustrating an example operation of the system according to the invention.

This flowchart includes the following steps:

a step 21 to initialise configuration of the system according to the invention; the access switch 15 to the open domain 12 being open and the access switch 14 to the avionics domain 11 being closed, a step 22 to update the system according to the invention receiving an access control configuration 23 and an authentication or access control rules 24, a test 25 to change the configuration of the system according to the invention with a switch 15 open and switch 14 closed output 26 followed by a step 27 to initialise the second protocol (avionics domain end) and return to step 21, a switch 15 closed and switch 14 open output 28 followed by a step 29 to initialise the first protocol (open domain end), a step 30 to store data in buffer memory and to acquire data from the open domain, a step 31 to filter data (firewall function) receiving a data filter configuration 32, a step 33 to memorise valid data, and return before the change configuration step 25, and a step 34 to erase the buffer memory.

Data are transferred between the open domain and the avionics domain 11 as follows:

output 28 from test 25 is used in the first step.

output 26 from the same test 25 is used in the second step.

The invention claimed is:

1. An onboard access control system to an information system onboard an aircraft, including an avionics domain satisfying clearly defined certification rules, and an open domain based on general public components accessible to all operators, the open domain operating according to a first communication protocol and the avionics domain operating according to a second communication protocol that is different from the first communication protocol, the system comprising:

a single-directional link that allows communication from the avionics domain to the open domain; and a secure link for communication from the open domain to the avionics domain, the secure link including an operator authentication section obtaining an operator's profile, and a security device comprising first and second hardware access switches operating as an electronic lock preventing a permanent communication link from the open domain to the avionics domain, the first hardware access switch connected between the open domain and a first access module and the second hardware access switch connected between a second access module and the avionics domain, a controller that receives the operator's profile and controls opening of the first and second hardware access switches for durations that depend on the operator's profile, the first access module including a first buffer memory, the first access control module being configured to receive data from the open domain through the first hardware access switch according to the first communication protocol and store the data originating from the open domain in the first buffer memory, the second access module including a second buffer memory, the second access module being configured to put the data from the first buffer memory into the second buffer memory for subsequent transmission through the second hardware access switch to the avionics domain according to the second communication protocol, a data control module situated between the first and second access modules and configured to define filter criteria applicable to all exchanges between the first and second buffer memories, and the controller is further configured to erase the first buffer memory before closing the second hardware access switch to allow the data from the second buffer memory to be transmitted through the second hardware access switch to the avionics domain according to the second communication protocol.

2. A system according to claim 1, in which the authentication section comprises an electronic reader, a biometric sensor, or a code reader.

3. A system according to claim 1, in which the operation authentication section comprises a secure link between the aircraft and ground to allow an operator on the ground to identify himself/herself to thereby obtain the operator's profile.

4. A system according to claim 1, in which the data control module includes protection mechanisms in a network, and transport and application layers of an OSI model.

5. A system according to claim 1, in which the data control module includes an encryption unit.

6. A system according to claim 1, in which the data control module is configured by a data filtering table.

7. A system according to claim 1, in which the first and second communication protocols used in each of the avionics and open domains are different and participate in increasing security of data exchanges between the avionics and open domains.

8. A system according to claim 1, in which the aircraft is a plane.

9. An aircraft using a system according to claim 1.

* * * * *